United States Patent
Livowsky

(12) 
(10) Patent No.: US 6,598,039 B1
(45) Date of Patent: Jul. 22, 2003

(54) NATURAL LANGUAGE INTERFACE FOR SEARCHING DATABASE

(75) Inventor: Jean-Michel Livowsky, Seine (FR)

(73) Assignee: Albert-Inc. S.A., Lausanne (CH)

( * ) Notice: Subject to any disclaimer, the term of this patent is extended or adjusted under 35 U.S.C. 154(b) by 0 days.

(21) Appl. No.: 09/327,605

(22) Filed: Jun. 8, 1999

(51) Int. Cl.⁷ .............................................. G06F 17/30
(52) U.S. Cl. ................................. 707/3; 707/6; 707/7
(58) Field of Search .............................. 707/1–10, 100, 707/513, 532; 704/1, 2, 9, 257; 706/45, 55, 61

(56) References Cited

U.S. PATENT DOCUMENTS

| | | | | |
|---|---|---|---|---|
| 4,674,066 A | | 6/1987 | Kucera | 707/5 |
| 4,974,191 A | | 11/1990 | Amirghodsi et al. | |
| 5,197,005 A | * | 3/1993 | Shwartz et al. | 707/2 |
| 5,218,536 A | | 6/1993 | McWherter | 707/533 |
| 5,257,366 A | | 10/1993 | Adair et al. | |
| 5,265,065 A | * | 11/1993 | Turtle | 707/4 |
| 5,317,742 A | | 5/1994 | Bapat | |
| 5,386,556 A | | 1/1995 | Hedin et al. | |
| 5,404,507 A | * | 4/1995 | Bohm et al. | 707/4 |
| 5,410,688 A | | 4/1995 | Williams et al. | |
| 5,428,772 A | | 6/1995 | Merz | |
| 5,491,820 A | | 2/1996 | Belove et al. | |
| 5,519,608 A | | 5/1996 | Kupiec | |

(List continued on next page.)

FOREIGN PATENT DOCUMENTS

| | | | | |
|---|---|---|---|---|
| JP | 11 045266 | 2/1999 | ......... | G06F/17/30 |
| WO | WO 98/25217 | 6/1998 | ......... | G06F/17/30 |
| WO | WO 98/26357 | 6/1998 | ......... | G06F/17/30 |
| WO | WO 98/49640 | 11/1998 | ......... | G06F/17/60 |
| WO | WO 00/03329 | 1/2000 | ......... | G06F/17/00 |

OTHER PUBLICATIONS

Das, Bikas et al. "Experiments In Using Agent–Based Retrieval from Distributed and Heterogeneous Databases," IEEE 1997, pp. 27–35. XP–002144267.
Julian, Lauri et al. "Brightware Ships Web's First Automated Real–Time Advice Agent," Brightware, Inc. Press Release, Jun. 29, 1998. XP–002924861. Http://www.brightware-.com/news/99_6_2_9_bwships.html.
Lai, Hsiangchu et al. "A System Architecture of Intelligent–Guided Browsing on the Web," IEEE 1998, pp. 423–432. XP–002128394.
Yang, Kiduk et al. "IRIS at TREC–7," Seventh Test Retrieval Conference, Nov. 9–11, 1998, p. 1. XP–002142686.

*Primary Examiner*—Diane D. Mizrahi
*Assistant Examiner*—Apu Mofiz
(74) *Attorney, Agent, or Firm*—Howrey Simon Arnold & White, LLP

(57) ABSTRACT

A system and method for searching information from a database using a natural language. In one embodiment, the system analyzes a natural language search request and converts the search request into one or more search words. The search words are further converted into a string of bytes, and a subset of a target database, referred to as the datasoup, is searched. If there is a match between the bytes and raw data in the datasoup, the searched data is retrieved from the target database. The searched data is then formatted and provided to a user. Optionally, the searched data can be provided to the user unformatted. In another embodiment, the system includes a system server configured to receive a natural language search request, a core engine coupled to the system server and to the target database, and a system database coupled to the core engine, where the core engine accesses the system database to analyze the search request. The system database stores global rules, one or more preference files, and one or more dictionaries, and the preference file stores information about the user.

24 Claims, 10 Drawing Sheets

U.S. PATENT DOCUMENTS

| | | |
|---|---|---|
| 5,590,319 A | 12/1996 | Cohen et al. |
| 5,590,322 A | 12/1996 | Harding et al. |
| 5,640,555 A | 6/1997 | Kleewein et al. |
| 5,684,999 A | 11/1997 | Okamoto |
| 5,694,593 A | 12/1997 | Baclawski |
| 5,706,499 A | 1/1998 | Kleewein et al. |
| 5,740,421 A | 4/1998 | Palmon |
| 5,752,028 A | 5/1998 | Ellacott |
| 5,754,841 A | 5/1998 | Carino, Jr. |
| 5,761,663 A | 6/1998 | Lagarde et al. |
| 5,765,028 A | 6/1998 | Gladden |
| 5,768,577 A | 6/1998 | Kleewein et al. |
| 5,768,589 A | 6/1998 | Bradley et al. |
| 5,778,368 A | 7/1998 | Hogan et al. |
| 5,787,410 A | 7/1998 | McMahon |
| 5,787,424 A | 7/1998 | Hill et al. |
| 5,809,502 A | 9/1998 | Burrows |
| 5,826,261 A | 10/1998 | Spencer |
| 5,864,845 A | 1/1999 | Voorhees et al. |
| 5,864,846 A | 1/1999 | Voorhees et al. |
| 5,873,080 A | 2/1999 | Coden et al. |
| 5,878,219 A | 3/1999 | Vance, Jr. et al. |
| 5,884,302 A | 3/1999 | Ho ............................ 707/3 |
| 5,895,466 A * | 4/1999 | Goldberg et al. ............ 707/5 |
| 6,026,388 A * | 2/2000 | Liddy et al. .................. 704/9 |
| 6,144,958 A * | 11/2000 | Ortega et al. ................. 707/5 |
| 6,169,986 B1 * | 1/2001 | Bowman et al. .............. 707/5 |

* cited by examiner

NATURAL LANGUAGE INTERFACE FOR SEARCHING DATABASE

RELATED APPLICATIONS

This application is related to concurrently filed applications titled, "System and Method for Enhancing E-Commerce using Natural Language Interface for Searching Database", application Ser. No. 09/327,604, commonly assigned, and which is incorporated by reference, and "System and Method for Enhancing Online Support Services using Natural Language Interface for Searching Database", application Ser. No. 09/327,603, commonly assigned, and which is incorporated by reference.

BACKGROUND OF THE INVENTION

1. Field of the Invention

The present invention relates generally to information retrieval, and more particularly to a computer program for information retrieval (e.g., in databases or in the Web).

2. Description of the Related Art

Recently there has been a tremendous rise in the use of the Internet related activities. Many databases are now connected to the "outside world" using internet technology, which allows users to search databases via the Internet and/or a company intranet. More and more users are using the Internet for educational, commercial or personal needs. Several browsers have been developed to "surf" the Internet, and many search engines are now accessible through the Internet that assist users to search databases.

Although, users may search databases with these search engines, there are many disadvantages associated with them. Most conventional search engines are not "user friendly." For example, they do not accept queries (search requests) in a natural language form. Most search engines require users to formulate search words with Boolean operators. Thus, users unfamiliar with boolean operators experience difficulties using these search engines.

Also, most search engines provide results only if there is an exact match between the user formulated search words and the content in the database. Most search engines do not consider synonyms and other approximations of the search words. Thus, if the user does not use the "right" word in the query, it is likely that the search engine will fail to find a relevant answer for the user.

Furthermore, most search engines are not capable of processing misspelled queries or queries having syntax errors. Thus a user who made a spelling or a syntax error in the query may not be able to find an answer.

Moreover, most search engines do not provide answers that are user specific or personalized. For example, if a butcher, a stockbroker, and a boxer each include the word "pound" in a search request, they may not be referring to the same object. Since the word "pound" may have different meaning depending on the context, most search engines will not be able to correctly process the search request for all three users. Thus, most search engines may provide a correct answer to the butcher, but may provide an incorrect answer to the stockbroker and the boxer.

Also, most search engines are rigid in that their knowledge database does not evolve through use. Most search engines do not extract information from prior search sessions to upgrade their own vocabulary and knowledge databases. Also, most search engines require an extensive dictionary to operate.

For these reasons, it has been recognized that there is a need for an interface for a search engine that is user friendly and accepts natural language queries. Also, there is a need for an interface that can process misspelled queries and queries having syntax errors. Moreover, there is a need for an interface that allows a search engine to provide user specific or personalized answers. Furthermore, there is a need for an interface that allows a search engine to extract information from prior search sessions and upgrade its own vocabulary and knowledge database.

SUMMARY OF THE INVENTION

The present invention is a system and method for searching information from a database (structured or unstructured), using a natural language. In one embodiment, a method for searching a database (also referred to as a target database) using a natural language comprises the steps of receiving a user formulated search request in the natural language, and converting the search request into a list of search words. The list of search words includes most restrictive search words having relevant words from the search request, and includes additional search words created by various approximations of the relevant words from the search request. The search words are converted into a string of bytes, and a datasoup (a subset of the target database) is searched with the string of bytes. If a match exists in the datasoup, the results are retrieved from the target database and provided to the user.

The method additionally comprises the steps of creating a preference file for a user, and storing information about the user in the preference file. The information includes information related to the user's identification, the user's own vocabulary, use of synonyms, common spelling errors, and unique writing style. The stored information is retrieved from the preference file to analyze the search request.

The method additionally comprises the step of accessing a system database to analyze a search request, the system database storing global rules, one or more preference files, and one or more dictionaries, although the latter are not mandatory. The method additionally comprises the steps of identifying and extracting essential words from the search request in order to generate most restrictive search words, and generating the additional search words from the essential words using synonyms, phonetically similar words, and spelling corrections.

In one embodiment, a system for searching a target database using a natural language comprises a system server configured to receive a search request formulated by a user in the natural language, a core engine coupled to the system server and to the target database, the core engine processing the search request, and a system database coupled to the core engine, the core engine accessing the system database to analyze the search requests. The system database stores global rules, one or more preference files, and one or more natural language dictionaries. The preference file stores information about the user, including personal information related to the user, and information regarding the user's own natural language vocabulary, use of synonyms, common spelling errors, and unique writing style.

In one embodiment, the core engine comprises a Master Engine (ME) configured to process the user formulated search request, and a Meta Engine Transcription Automata (META) coupled to the ME and configured to post-process data in the ME during off-line, the META providing rules to the ME regarding the processing of the search requests, construction of a knowledge database in the system database, and searches within the knowledge database.

The system further comprises a User Language Automata (ULA) coupled to the ME and the META, the ULA configured to analyze language in the preference files, the ULA retrieving user specific information from the preference files and providing the information to the ME, wherein the information is subsequently processed by the META during post-analysis.

BRIEF DESCRIPTION OF THE DRAWINGS

In the drawings, like reference numbers generally indicate identical, functionally similar, and/or structurally similar elements. The drawings in which an element first appears is indicated by the leftmost digit(s) in the reference number.

DETAILED DESCRIPTION OF THE INVENTION

I. Overview of the Invention

The present invention is a system and method for searching information from a target database using a natural language. The target database may be a general database engine (including, but not limited to Access, Oracle, Sybase, SQL-Server databases), located on a network (including, but not limited to an intranet or the Internet). The invention acts as a front-end to the database, and allows a user to search the database using a natural language, rather than conventional search terms.

In one embodiment, the system comprises a computer program code, written in C++, Java or any other computing language, configured to process a search request (also referred to as a query) formed in a natural language. Briefly stated, the system analyzes the search request and converts the search request into one or more search words (also referred to as search terms). The search words are further converted into a string of bytes, and a datasoup, which is a subset of the target database, is searched. If there is a match between the bytes and raw data in the datasoup, the data is retrieved from the target database, using links retrieved from the datasoup. The searched data is then formatted into a selected format and provided to a user. The searched data may include multimedia content, including video, audio, and data. The raw data from the datasoup may, however, be provided to the user unformatted.

II. Description of the Preferred Embodiments

Figure 1:
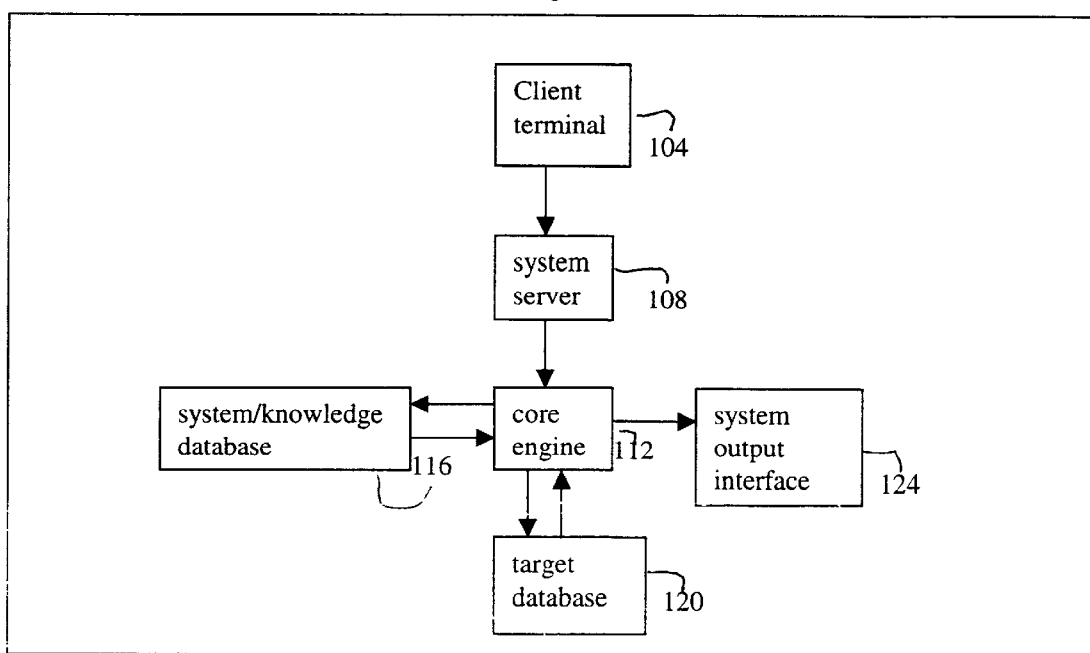
FIG. 1 illustrates a system according to one embodiment of the invention.

In one embodiment, a system 100 according to one embodiment of the invention comprises a client or user terminal 104, a system server 108, a core engine 112, a system database 116, a target database 120, and a system output interface 124 as illustrated in FIG. 1.

In one embodiment, the client or user terminal 104 is an interface, like an Internet browser, that provides users access to e-commerce, online help desk, or any other type of services. The system server 108 provides a front-end interface between the client or user terminal 104 and the core engine 112. The system server 108 receives a search request from the client, and relays the search request to the core engine 112.

The core engine 112 processes the search request and creates a list of search words by various approximations. The core engine 112 converts the search words into a string of bytes, and the database 116 is searched using the bytes.

The core engine 112 is connected to the system database 116. The system database 116 is accessed by the core engine 112 to analyze a search request, but not to find an answer to the search request. In one embodiment, the system database stores a datasoup, preference files, some optional dictionaries, global rules (e.g., an expert system and lexicographical filters).

In one embodiment of the invention, the system 100 registers each user automatically as the user accesses the system. The system creates a preference file as the user is registered. The preference file may be implemented in the system server or the client server. The preference file stores information about to the user, including, but not limited to, information about the user's own natural language vocabulary, writing style, common spelling errors, use of synonyms, etc. The preference file is updated as new information is automatically learned from the user.

Figure 2:
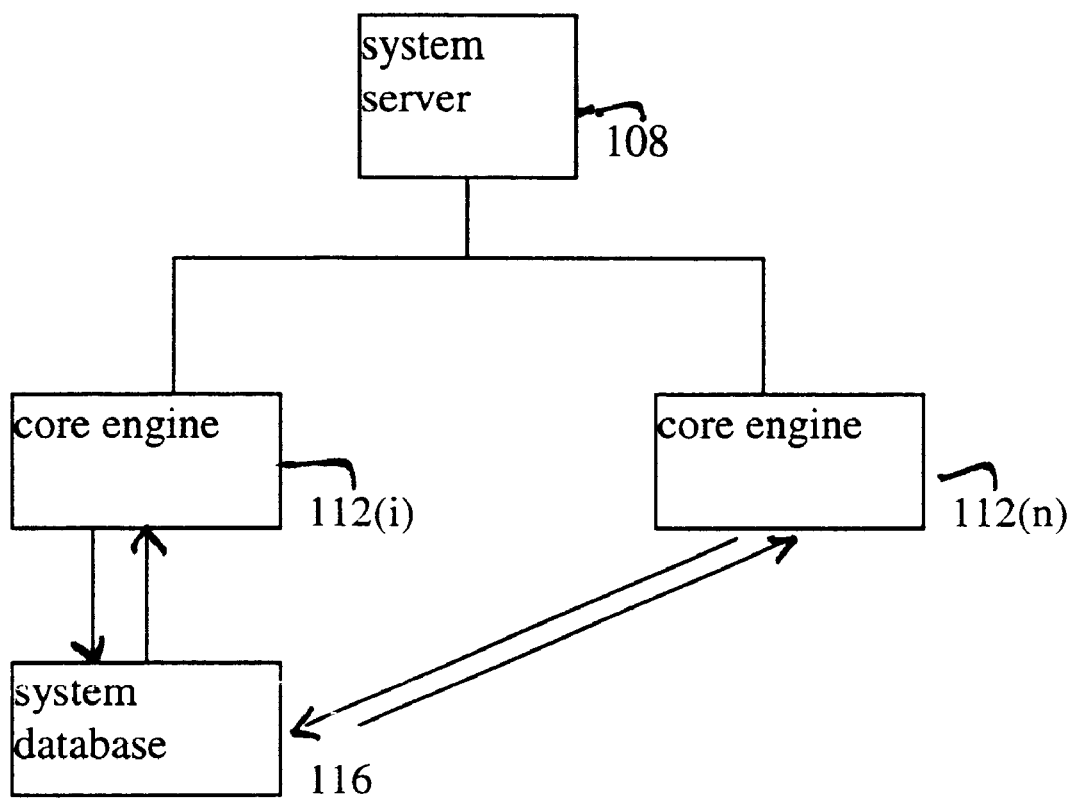
FIG. 2 illustrates another embodiment of the invention wherein multiple core engines are connected to a system server.

FIG. 2 illustrates an embodiment of the present invention wherein multiple core engines 112(i)–112(n) are connected to the system server 108. Each core engine 112 is connected to the same system database 116. In this embodiment, the server system 108 acts as a load-balancer, and distributes the search requests among the several core engines 112 based on their capacity.

Figure 3:
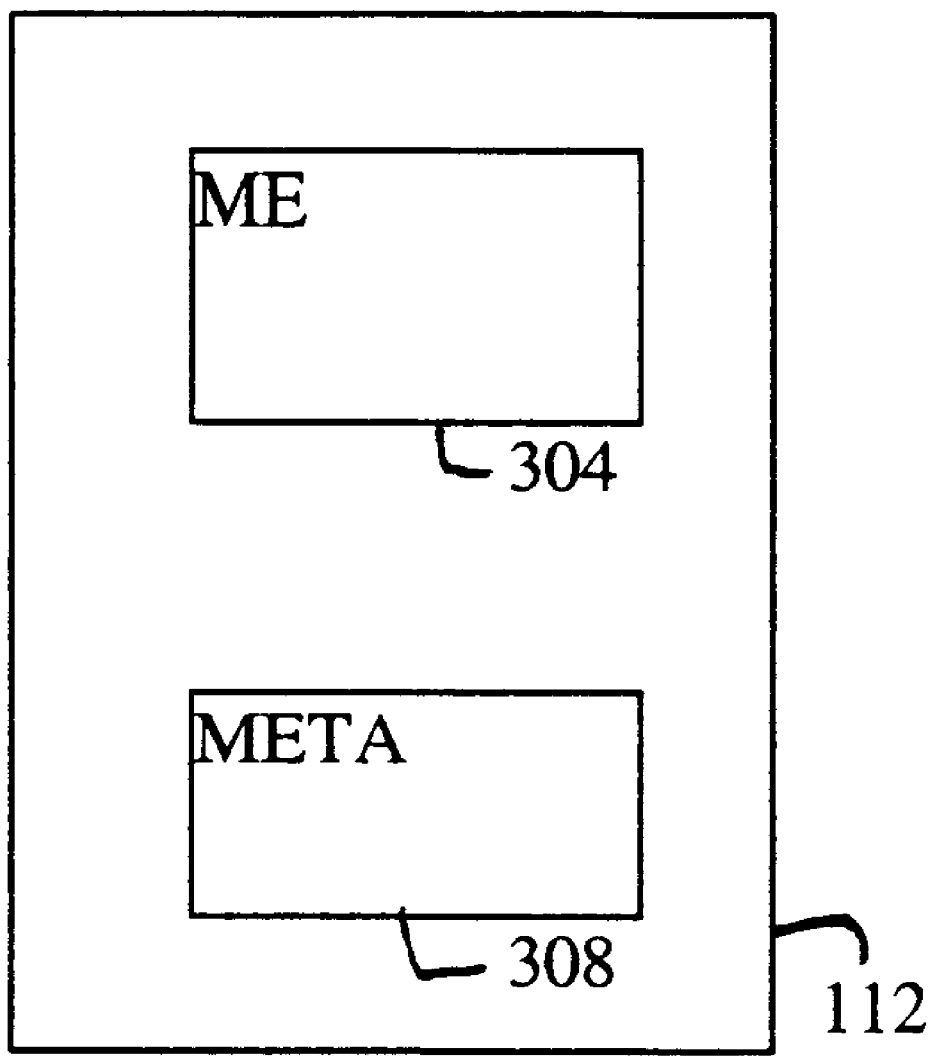
FIG. 3 illustrates a core engine in more detail.

FIG. 3 illustrates the core engine 112 in more detail. In one embodiment, the core engine includes a Master Engine (ME) 304 and a Meta Engine Transcription Automata (META) 308. Generally, a master engine is assigned to a user to process the user's search request. However, the system can be configured so that a master engine is assigned to two or more users.

In operation, the ME 304 receives a search request from the system server and forms a list of search words. The search words include phonetic approximations, synonymous approximations, and various combinations of the search words. The ME 304 converts the search words into a string of bytes and searches the datasoup.

In one embodiment, the datasoup is a subset of the target database. The datasoup stores only the most relevant information from the target database as identified by the database owner. Each record in the datasoup includes a link whereby some corresponding records in the target database are accessed.

Consider, for example, that a service provider maintains a target database of all veterinarians. Each record in the target database may include the name of a veterinarian, an address, a telephone number, types of services offered, cost for services, etc. The service provider may identify the name of the veterinarian and the address as the relevant information to be included in the datasoup. The system then creates the datasoup that includes only the relevant information from the target database.

Figure 4:
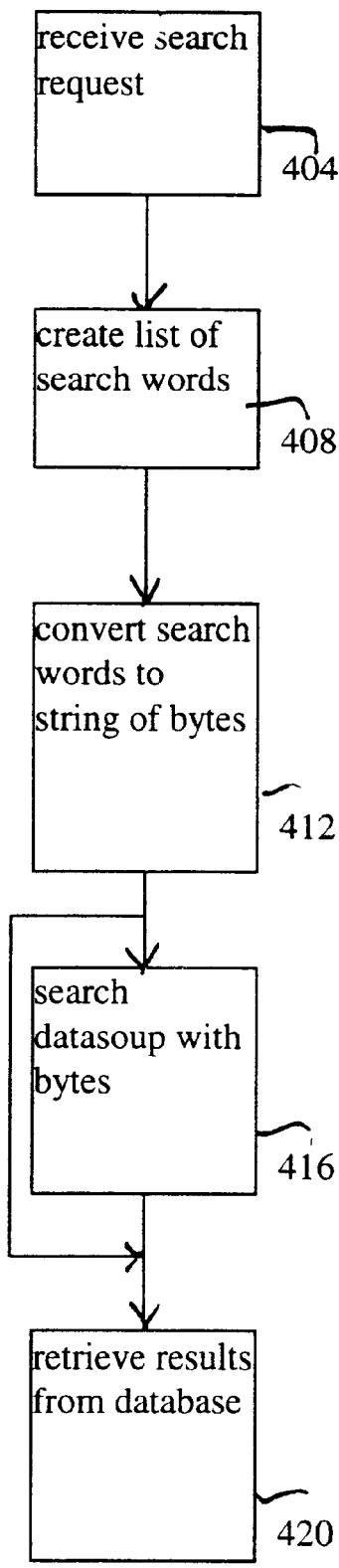
FIG. 4 is a flow diagram illustrating several steps involved in searching a database in accordance with one embodiment of the invention.

FIG. 4 is a flow diagram illustrating several steps involved in searching a database in accordance with one embodiment of the present invention. In a step 404, a user formulated search request in the natural language is received. In a step 408, the search request is converted into a list of search words, the list of search words including most restrictive search words having relevant words from the search request, the list further including additional search words created by various approximations of the relevant words from the search request. In a step 412, the search words are converted into a string of bytes. In a step 416, the datasoup is searched with the string of bytes. In a step 420, results from the target database are retrieved if there is match in the datasoup. If there is no match, step 416 is repeated using the additional search words.

In one embodiment, the META 308 provides rules to the ME 304 how to process a search request in a natural language form, how to build or maintain the knowledge database, and how to perform searches within the knowledge database. In addition, the META 308 defines the relevancy of the rules to the ME 304, and prioritizes the rules under which the ME 304 operates. For example, the META can make obsolete old rules and create new rules for the ME 304.

In one embodiment, the META 308 post-processes (also referred to as post-analysis) past requests during off-line. During the post-analysis, the META 308 analyzes the knowledge database (or language conceptual graph). Through post-processing, the META 308 modifies the ME's natural language processing algorithm parameters, creates or make obsolete algorithms, and prioritizes various rules. Thus, the ME has an optimized algorithm related to the current state of the knowledge database.

Figure 5:
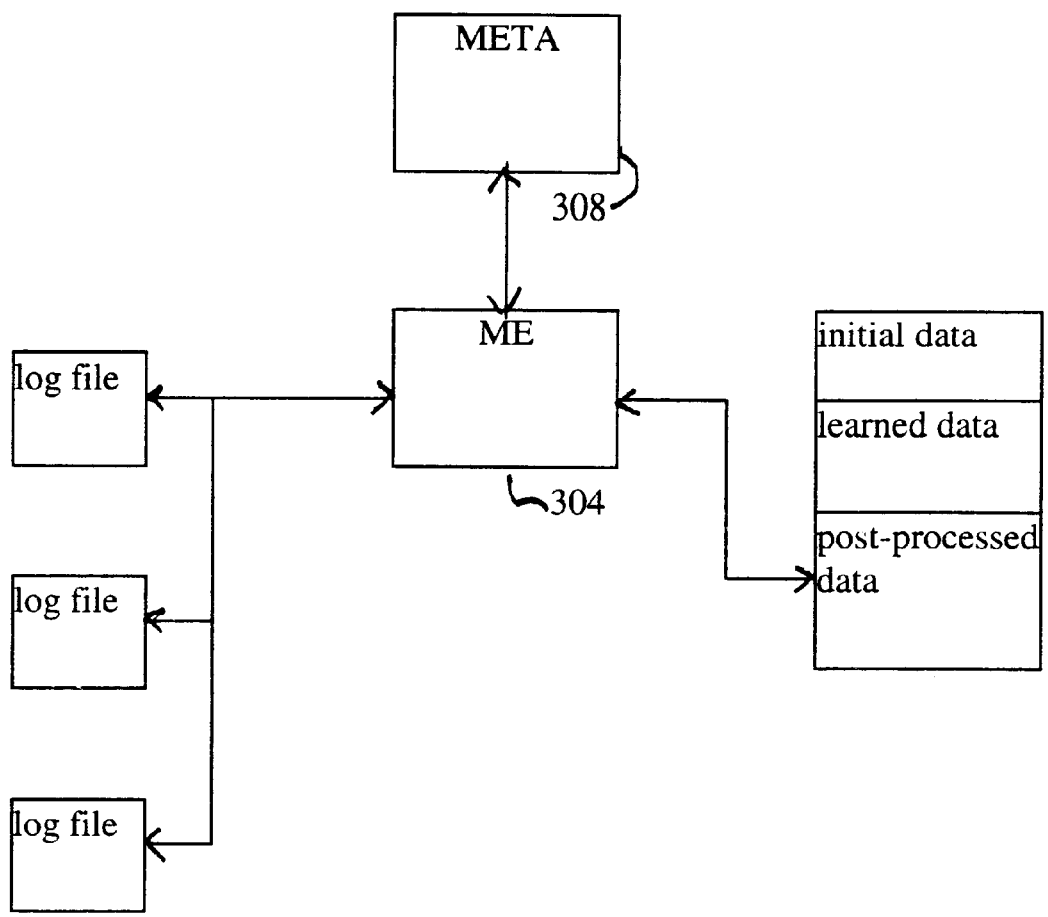
FIG. 5 illustrates a post-analysis process in accordance with one embodiment of the invention.

In one embodiment, a log file is created after each session with a user. The log file can be implemented in the system database. During off-line post analysis, the META 308 reviews all users log files to enhance its knowledge base. More specifically, the META reviews the log files during post analysis and adds post-processed data to its knowledge database. This feature is illustrated in FIG. 5.

In one aspect, the information from the META 308 is of a general (vs. local) nature. It relates to the off-line post-analysis of the ME 304. The post-analysis is performed on aggregate information (the language), which is then reinterpreted at the unit level (the preference file, i.e., the user's language). During post-analysis, the META analyzes the datasoup, but it does not modify it. Datasoup modification is performed by ME upon META's instructions.

In one embodiment, the META provides rules to the ME to identify the subject matter of the search request. For example, the ME may identify the search request as being related to religion, politics, medicine, law or any other subject matter. These rules allow the ME to quickly process the search request by selecting synonyms appropriate for the context.

Figure 6:
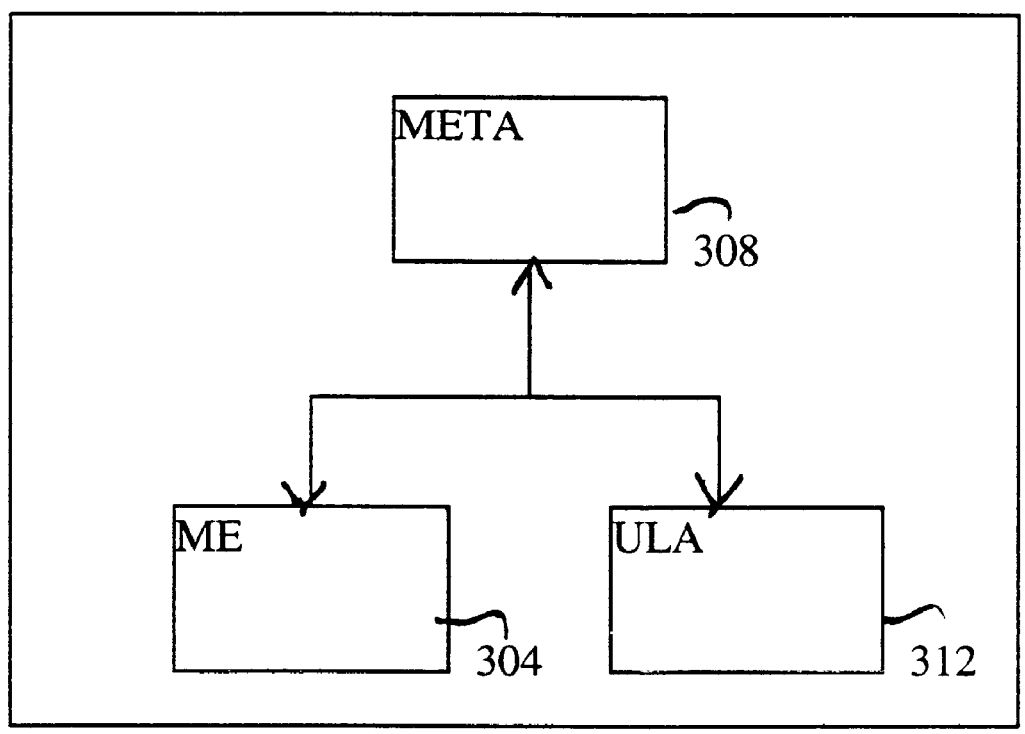
FIG. 6 illustrates a User Language Automata (ULA).

In one embodiment, the core engine includes a User Language Automata (ULA) 312. FIG. 6 shows a ULA 312 connected to the ME 304 and the META 308. Briefly stated, the ULA 312 is a computer program, running on the client terminal, configured to analyze language at the preference file level.

During offline post-analysis, the ULA 312 analyzes the preference files and provides the ME with possible connections between words recited in the search request and words in the preference file. Also, the ULA 312 analyzes individual knowledge trees in the preference files and builds a global knowledge tree, known as the conceptual graph. The global knowledge tree is implemented in the system database. In one embodiment, the ULA retrieves information from the preference files and sends the information to the ME, which are then processed by the META during post-analysis.

Thus, the ULA extracts a user specific relevant information from the preference files. The ULA establishes connection between the information from the user level, e.g., the preference file, and the language.

In one aspect, the system's learning process is a result of a back and forth information transfer between the user level (the ULA and the preference file) and the aggregate of all the ULAs. As in statistical analysis, information obtained from local units whose behavior is considered chaotic is not transformed into global rules. However, if a large number of local units exhibit the same type of behavior, then global rules are established from the local units. At the user level, new links between its knowledge tree and other knowledge trees are established. The overall aggregate of these knowledge trees is the represented at the global knowledge tree (or language conceptual graph) in the knowledge database.

As shown before, in one embodiment, a single ME is connected to a META. In that case, the ME is connected to a target database. In an alternate embodiment, a plurality of MEs can be connected to a META. In that case, each ME is connected to a target database.

Figure 7:
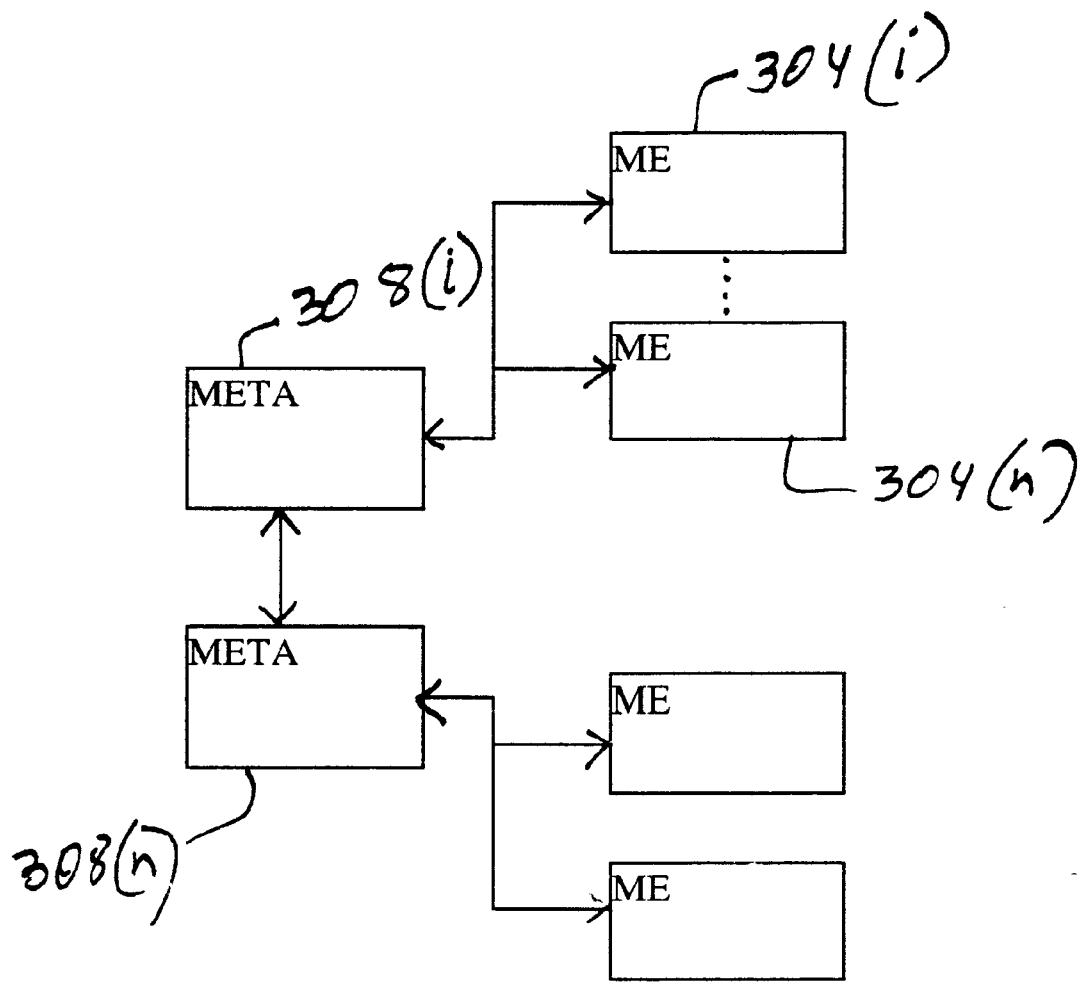
FIG. 7 illustrates another embodiment of the invention wherein a plurality of system servers are connected to each other.

In yet another embodiment, shown in FIG. 7, a plurality of system servers are connected to each other. Each system server is connected to a single META, each META being connected to one or more MEs. The METAs communicate with each offline during post-analysis. The METAs share their knowledge and upgrade the global knowledge tree.

In one aspect of the invention, the ME is capable of operating independently from the META. Accordingly, if the ME is not coupled to the META, the ME can still process search requests. In that case, the global rules are not upgraded by the META.

Figure 8:
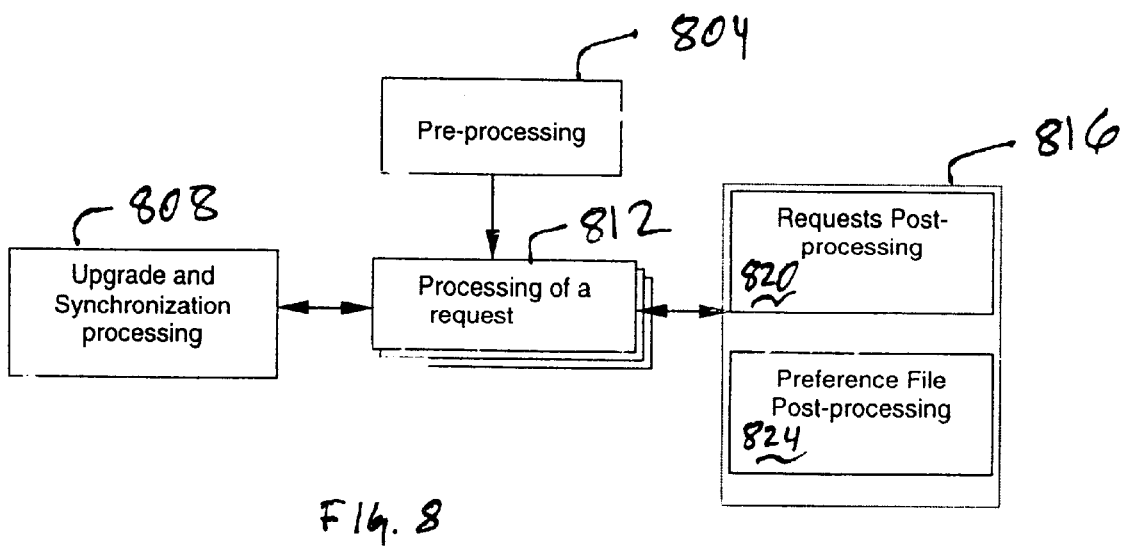
FIG. 8 illustrates the processing in accordance with one embodiment of the present invention.

FIG. 8 illustrates the processing in accordance with one embodiment of the present invention. Referring now to FIG. 8, a preprocessing element 804 is used to initialize the system database. This step is performed during the installation of the system in a dedicated environment. An upgrade and synchronization element 808 links the system to the target database. The element 808 also synchronizes with the target database, and feeds permanent external data.

A processing element 812 processes requests from an end-user. This element is also called a Master-Engine (ME). A post-processing element 816 comprises two sub-elements. A Meta Engine Transcription Automata (META) 820 post-processes requests sent by the end-users during the sessions. A User Language Automata (ULA) 824 post-processes preference files.

Except for the pre-processing element 804, which operates during the installation of the system, the other elements operate simultaneously as competitive tasks. For example, the processing of a request may be duplicated to deal with more than one end-user at a time. These processes are also competitive processes, especially for accessing the system's resources.

Figure 9:
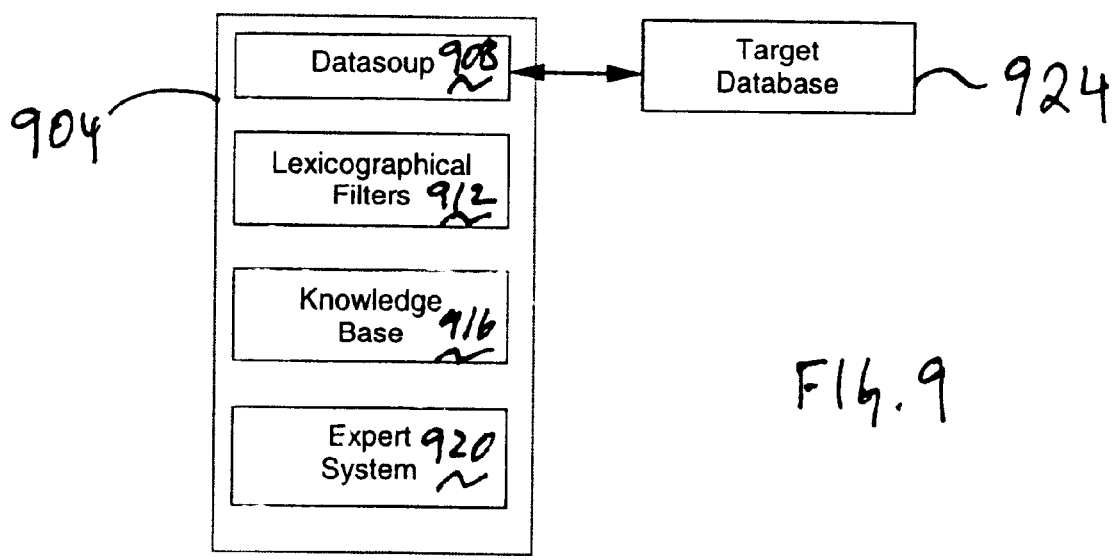
FIG. 9 illustrates a set of inter-related databases in accordance with one embodiment of the present invention.

In one embodiment, the "system database" is a set of inter-related databases 904 as illustrated in FIG. 9. They are implemented either as separate entities inside a unique relational database for small systems or as separate databases on different servers for large systems requiring large amounts of data.

A datasoup 908 is used as the interface between a target database 924 and the core engine. The mechanisms implemented for the communication between the datasoup 908 and the target database 924 depend on the nature of the target database 924. They are built on market standards including, but not limited to, Structured Query Langage (SQL), Open Database Connectivity (ODBC), Java Database Connectivity (JDBC), or specific Application Programming Interface (API).

A plurality of lexicographical filters 912 decide which words from the end user's request should be taken into account, and which words should not be taken into account. In one embodiment, the filters 912 include: a list of "mandatory words", i.e., words that should not be taken into account according to algorithms, but that are still kept for the query due to their relevancy; and a list of "forbidden words", i.e., words that should be taken into account according to the algorithms, but that are discarded due to their irrelevancy. The lists are initialized during the pre-processing, and modified and/or updated during the post-processing.

A knowledge database 916 is used to store and retrieve contextual synonyms as well as concepts learned by the system in time. During the pre-processing stage, the knowledge database 916 may be initialized by an already existing database coming from another system platform if the context of the new system is similar to the context of the old system.

An expert system 920 includes the system's algorithms. The expert system 920 contains weights used to work out the various steps for the processing of a request and for the post-processing. The weights can be modified during the post-processing stage using a feedback analysis.

Figure 10:
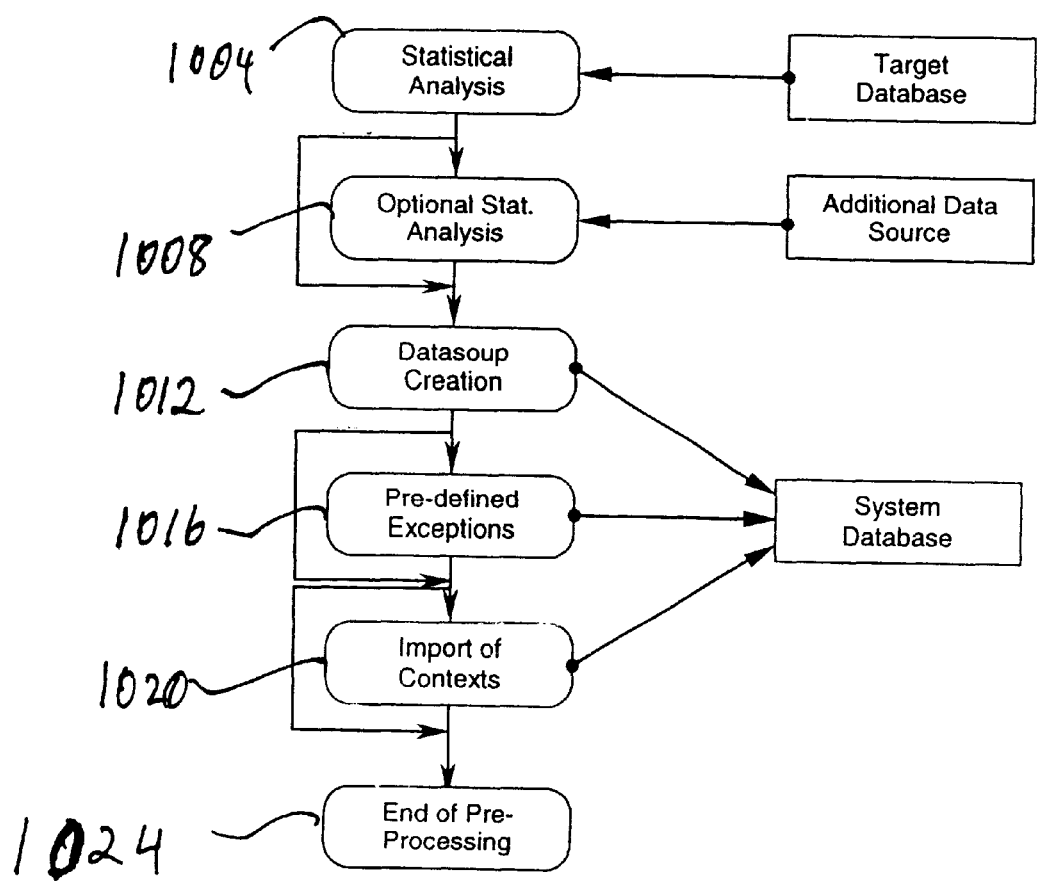
FIG. 10 illustrates a flowchart of the pre-processing steps.

In one embodiment, the pre-processing is performed during the installation of the system in a dedicated environment. FIG. 10 illustrates a flowchart of the pre-processing steps.

In a step 1004, a statistical analysis is done on a target database. This task requires the definition of the semantic description of the target database, i.e., to define which pieces of information are relevant to the future queries and which ones are not relevant. For example, consider an example of a target database consisting of a professional telephone directory. The system may decide on one hand, that the name and the description of the companies are relevant data, and on the other hand, that the phone numbers are not relevant (assuming the intention is not the replacement of the basic electronic directory software).

This statistical analysis may be optionally followed by an analysis (step 1008) on additional data coming from another database (not the target database). This additional data can be used to feed the "system database" with relevant information that will help to create contextual synonyms. For example, there may be another database containing additional information about the description of the companies referenced into the directory such as movies, theaters and museums, etc. This additional database is not part of the target database. However, the additional information provided by this database can help feeding the internal database with relevant contextual data.

In a step 1012, a datasoup is created using the previous results from steps 1004 and 1008. The datasoup includes: the relevant data from the target database; a reference system which allows the synchronisation between the target database and the datasoup, since the target database is likely to be updated as time goes along; the calculation of the phonetic approximation of the imported data; and the creation of reference links, which will be used by the knowledge database. This step will start feeding the internal database.

In a step 1016, the system database is entered. The system applies predefined exceptions for some words. The predefined exceptions allow the system to bypass some rules. In a step 1020, a set of data coming from another system is added to the system database. The step 1020 allows the system to retrieve some previous 'experience' of another system. In one embodiment, the steps 1016 and 1020 are optional. Their implementation depends on the requirements of the system. Finally, in a step 1024, the preprocessing is completed.

In one embodiment, the system 100 is configured so that the ME is connected to wire services, such as Reuters, AP, AFP (this information feed is not limited to textual information). The ME continuously receives current news. This allows the system to learn new words as well as new relations between them, improve its vocabulary, and establish new global rules and update some of its weighting coefficients. An important feature of the system is that unlike most other search engines, it does not require a large dictionary to operate. The system continuously upgrades it vocabulary as it processes more and more search requests, and upgrades its knowledge database (i.e., language conceptual graph and global rules). The system not only learns new words, but also learns different meanings associated with words in different contexts. It is noteworthy that while the inclusion of general and specific dictionaries can accelerate the learning process, they are however not mandatory.

For example, if a butcher, a stockbroker, and a boxer each include the word "pound" in a search request, they may not be referring to the same object. Since the word "pound" may have different meaning depending on the context, most search engines will not be able to correctly process the search request for all three users. Thus, most search engines may provide a correct answer to the butcher, but may provide an incorrect answer to the stockbroker and the boxer.

In contrast, the present invention realizes that the word "pound" may have a different meaning depending on the context. The present invention utilizes the preference files to identify the user, and the correct meaning of "pound" in that context.

Consider that the butcher, the stockbroker and the boxer each has a preference file that includes a different meaning of the word "pound" as implied by the user. In the butcher's preference file, there exists a link between "pound" and "weight." In the stockbroker's preference file, there is a link between "pound" and "currency", and in the boxer's preference file, there is a link between "pound" and "boxing."

In operation, the system 100 accesses the preference file of each user to learn about the different meaning of pound as implied by the user. As a result, the system correctly processes each search request using the appropriate meaning as required for each user.

Suppose, for example, a new user accesses the system, and is subsequently registered. Although a preference file is immediately created for this user, it does not contain any relevant information yet since the user has never used the system before. Now suppose, the user enters the following search request: "Is there a pound nearby from where I can adopt a dog?" In the absence of any relevant information in the preference file about "pound" in this context, the answer is unlikely to be satisfactory to the user.

Suppose the user is not satisfied with the results and subsequently rephrases the search request as "Is there an animal shelter from where I can adopt a dog?" This will enable the system to perform a comparative analysis of the successive search requests. The comparative analysis is part of the learning process of the system. The comparative analysis of the successive search request will create yet another meaning of the word "pound" as being an animal shelter. This link between a pound and an animal shelter will hold true for the specific user only. In the preference file, the system records that pound may be a synonym for homeless shelter. However, if many other users (e.g., greater than a predetermined number of users) enter similar search requests, the system will update each user's preference file to reflect the new information, and also create a global rule that a pound may be a synonym for homeless shelter. In the global rule, the system assigns a coefficient to the link between a pound and a homeless shelter. The coefficient indicates the probability that the pound is a shelter when used in a particular context. In one embodiment, once a global rule is created, the local rules in the preference files are deleted.

The above example illustrates several distinctive features of the invention. In one aspect, the more the system is requested and/or fed by any information source, the better it performs. The system's answers are user specific, because the system identifies the user and utilizes the user's very own vocabulary. The system creates global rules from a set of users specific information. Also, each new request submitted to the system is immediately taken into account to customize the answer.

As stated before, the ME 304 converts a search request into a list of search words. In one embodiment, the ME 304 strips all non-essential words from the search words. Words such as pronouns, articles, prepositions, verbs, adverbs etc., are generally considered non-essential. The ME 304 considers a word relevant if:

(1) It does not exist in the target database and there are few words having a phonetic structure close to the word; or
(2) It does not have a synonym; or
(3) It has a distant synonym; or
(4) It occurs in high frequency in the database and occurs in low frequency in all queries; or
(5) It occurs in high frequency in all queries and occurs in low frequency in the database.

Consider, for example, that a user submits a search request: My dog is sick. The ME extracts the words dog and sick in order to construct search words "dog sick." The ME then creates one or more alternate search words using synonyms. Each synonym is assigned a coefficient based on the closeness of its meaning to the original word. The original word is assigned a coefficient 1.0. This process is shown below in Table I.

TABLE I

| word | synonym | coefficient |
| --- | --- | --- |
| dog | canine | 0.9 |
| dog | animal | 0.7 |
| sick | ill | 0.8 |
| sick | hospital | 0.7 |
| sick | doctor or veterinarian | 0.6 |

The synonyms and various combinations thereof are used to form alternate search words. The alternate search words are listed in an order based on their combined total weights. Thus, an order of alternate words based on synonymous approximations of "Dog Sick" can be "Canine Ill" with a combined total weight of 0.8(0.9+0.8=1.7), "Animal Ill" with a combined total weight of (0.7+0.8=1.5), and "Animal Hospital" with a combined total weight of (0.7+0.7=1.4). A search word may also be formed by a single word such as Dog (1.0), Canine (0.9) or Ill (0.8), etc.

Furthermore, the ME constructs additional search words by a method known as phonetic approximation. The ME selects words that are phonetically similar or bear a close resemblance to the original words "Dog" and "Sick." The ME assigns a coefficient to each phonetically similar word based on its similarity with the original word, and uses the phonetically similar words and combinations thereof to form additional search words.

Similarly, additional search words can be created by spelling correction or by switching certain letters in a word. For example, a user's preference file can be used to determine if the user frequently spells certain words incorrectly, or that the user frequently switches certain letters in some words. The information from the preference file can be used to create additional search words.

The list includes the original search words "Dog Sick", which is also referred to as the most restrictive search words, because it contains all the original words. In one embodiment, the list includes gradually narrowing search words, i.e., less restrictive search words with less number of words.

In one embodiment, the ME takes the most restrictive search words and converts it into a string of bytes. The reason the search words are converted from text string to bytes code is because bytes code computation is faster than text string computation (a byte code can be an integer, and a byte code is not restricted to represent a character).

The datasoup is then searched using the bytes. If there is a match between one or more records in the datasoup and the integer bytes, the system accesses the target database and retrieves the corresponding searched data from the target database. The raw data from the target database is then provided to the user.

If there is no match between the most restrictive search words and one or more records in the datasoup, the ME 304 launches a language analysis process. The language analysis process is one of the distinguishing features of the present invention.

If there is a match between the most restrictive search words and one or more records and the user spends more than a maximum threshold time reviewing the search results, the system considers the user satisfied with the results. Based on the results, the ME can update the user's preference file.

Now suppose, the user resends the search request with only a minor modification. For example, the user modifies the search request as "My Dog is Very Sick." In this case the ME considers the user partially satisfied, because the user has made only minor modifications to the query. In reality, the ME considers Very (an adverb) as an irrelevant word, and forms the same search words, i.e., Dog Sick. According to the invention, the ME will then "open up" the search, beginning with the next search word in the list.

If the user resends the same search request or a search request having a very similar meaning, the ME considers the user dissatisfied with the search results. In this case, the ME also opens up the search with the next search word in the list. Also, if the ME cannot find an answer using the most restrictive search word, the ME opens up the list.

If the user sends a completely new search request after viewing the previous search result for less than a minimum threshold of time, the ME cannot determine if the user is satisfied or not. Accordingly, the ME will not open up the list, but rather, the ME will process the new request and create a new list of search words.

Thus, the ME will use the list of search words, if the user resends a similar request with or without minor changes, or the ME could not find an answer using the previous search words.

There is a significant advantage in creating a list of search words rather than relying on a single search word. Consider, that a target database is searched using only the original search words, i.e., dog sick. If there is not an exact match between the original search words and the target database, then the system will not be able to provide an answer.

However, if various approximations of the original search words are used to form a list of alternate search words, and the target database is searched using the list, there is a increased likelihood that an answer may be found in the target database.

Thus, if alternate search words are "canine", "canine ill" or "canine hospital", and the target database is searched using these alternate search words, there is a greater likelihood that a match will be found in the target database.

In this aspect, the present invention can be distinguished from conventional search engines that facilitate database searches. Most conventional search engines rely solely on the user formulated search request. If there is not an exact match between the user formulated search request and the target database, no answer will be provided. Thus, most conventional search engines either provides an exact answer based on the user formulated search request or no answer at all.

In contrast, the present invention strives to provide some relevant answers. Instead of relying solely on the user formulated search request, the present invention creates a list of search words and searches the database. The present invention provides some relevant answers in most cases through by relying on of the list of search words (even though the answers may not be exactly what the user is looking for). If no answer is found by using the most restrictive search words, the present invention is configured to go down the list of search words and search the database using each of the search words. If there is no match between any of the search words in the list and the target database, then no answer will be provided.

Another major distinction between the present invention and conventional search engines is the fact that most conventional search engines are not capable of processing a natural language search. For example, if a user enters a search request "My dog is sick", a conventional search engine will not be able to process the search request. This prevents many inexperienced users who are unable to phrase a sophisticated search word from using most search engines effectively. The present invention, in contrast, allows natural language queries. Thus, ordinary users who are inexperienced in constructing search words can easily search a database using the present invention.

Yet another distinction between the present invention and the conventional search engines is that the present invention adds its own intelligence to the search process. This feature is described in the following example.

Suppose, a user wishes to find a florist, and types a search request: "Flower Shop." A conventional search engine will process the search request and provide a list of flower shops from a target database.

Suppose, instead the user types "I want to purchase a gift." In this case, most conventional search engines will fail to process the search request, and thus will not provide an answer. The present invention, in contrast, will be able to process this search request by creating a list of search words that includes various synonyms and phonetic approximations of gifts and purchase. Thus, the answer may include a list of gift shops that offer various gifts, not merely flowers.

In one embodiment, the present invention is coupled to a voice-recognition system. The voice-recognition system can directly convert voices into integer bytes, which are then used by the present invention to search a database. Alternately, the voice recognition system can translate voices into text, which are then processed by the present invention.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for searching a target database using a natural language, comprising the steps of:

receiving a user formulated search request in the natural language;

converting the search request into a list of search words, the list of search words including most restrictive search words having essential words from the search request, the list further including additional search words derived from the essential words from the search request;

converting the search words into a string of bytes;

searching a datasoup with the string of bytes, the datasoup being a subset of the target database and having data and a plurality of records, each of the plurality of records having a link by which corresponding records in the target database are accessed;

matching the string of bytes with the data in the datasoup;

retrieving results from the target database;

creating an individual preference file for each user;

storing information about the user in the preference file, the information selected from the group consisting of: information relating to the user's identification, the user's queries, and information regarding the user's vocabulary, use of synonyms, common spelling errors, and unique writing style, said information being automatically created for each new user and updated at each access of said user as new information is automatically obtained from said user; and retrieving stored information from the preference file to analyze the user's search request without regard to stored information from preference files of other users.

2. The method as recited in claim 1, further comprising the steps of:

accessing a system database, the system database storing global rules, one or more dictionaries, and the preference file for each user; and analyzing the search request using the global rules, one or more dictionaries, and the preference file for each user.

3. The method as recited in claim 1, further comprising the steps of:

identifying the essential words in the search request;

extracting the essential words from the search request in order to generate the most restrictive search words; and generating the additional search words from the essential words using synonyms, phonetically similar words, and spelling corrections.

4. The method as recited in claim 3, further comprising the steps of:

searching the target database using the most restrictive search words; and searching the target database using the additional search words in a predetermined order.

5. The method as recited in claim 1, further comprising the steps of:

retrieving local rules from the preference file during post-analysis; and modifying global rules from the local rules, wherein the global and local rules are utilized in analyzing the search request.

6. The method as recited in claim 1, further comprising the steps of:
creating a plurality of log files, each representing a search session with a user;
reviewing the log files during post-analysis; and
retrieving information from the log files to update a knowledge database, the knowledge database being implemented in a system database; and
updating global rules by the information retrieved from the log files.

7. The method as recited in claim 1, further comprising the steps of:
assigning a coefficient to each of the additional search words, the essential words of the search request having the highest coefficient; and
prioritizing the additional search words.

8. The method as recited in claim 1, further comprising the step of formatting the results from the target database into a preselected format.

9. The method as recited in claim 1, further comprising the step of storing relevant information retrieved from the database.

10. A system for searching a target database using a natural language, comprising:
a system server for receiving a search request formulated by a user in the natural language;
a core engine for processing the search request, the core engine being coupled to the system server and to the target database;
a system database coupled to the core engine, wherein the core engine accesses the system database to analyze the search request; and
a datasoup having data and a plurality of records, the datasoup being a subset of the target database, each record in the datasoup having a link by which a corresponding record in the target database is accessed,
wherein the system database stores an individual preference file for each user, and wherein the preference file stores information about the user, said information selected from the group consisting of: information related to the user's identification, the user's queries, and information regarding the user's own vocabulary, use of synonyms, common spelling errors, and unique writing style, said information being automatically created for each new user and updated at each access of said user as new information is automatically obtained from said user, and said stored information is retrieved from the preference file to analyze the user's search request without regard to stored information from preference files of other users.

11. The system as recited in claim 10, wherein the system database stores global rules, and one or more dictionaries.

12. The system according to claim 10, the core engine comprising:
a master engine (ME) for processing the user formulated search request; and
a meta engine transcription automata (META) coupled to the ME, wherein the META post-processes the search request in the ME during off-line and provides rules to the ME regarding the processing of the search request, construction of a knowledge database in the system database, and searches within the knowledge database.

13. The system as recited in claim 12, further comprising a plurality of log files implemented in the system database, each of the plurality of log files representing a search session with the user, wherein the log files are reviewed by the META during post-analysis, and wherein the information retrieved from the log files are used to update the knowledge database and the global rules.

14. The system according to claim 11, the core engine comprising:
a master engine (ME) for processing user formulated search request; and
a meta engine transcription automata (META) coupled to the ME, wherein the META post-processes the search request in the ME during off-line and provides, rules to the ME regarding the processing of the search request, construction of a knowledge database in the system database, and searches within the knowledge database.

15. The system as recited in claim 14, further comprising a datasoup, the datasoup being a subset of the target database, wherein the ME converts the list of search words into a string of bytes, and wherein the datasoup is searched using the bytes.

16. The system as recited in claim 12, wherein a plurality of MEs are connected to the system server, each of the plurality of MEs being connected to the system database, wherein a plurality of search requests are distributed among the MEs depending on the load faced by each of the plurality of MEs.

17. The system as recited in claim 12, wherein the ME is connected to wire services for continuously receiving current news and for analyzing the news as a plurality of search requests, wherein the analysis of the news upgrades the knowledge database.

18. The system according to claim 12, wherein the system database stores a preference file for each user, the system further comprising a user language automata (ULA) coupled to the ME and the META, the ULA configured to analyze language in the preference file, the ULA retrieving user specific information from the preference file and providing the information to the ME, wherein the information is subsequently processed by the META during post-analysis.

19. The system as recited in claim 11, wherein the target database is accessible via any network protocol.

20. The method as recited in claim 10, further comprising the step of storing relevant information retrieved from the database.

21. A program storage device readable by a machine, tangibly embodying a program of instructions executable by the machine to perform method steps of searching a target database using a natural language, the method comprising the steps of:
receiving a user formulated search request in the natural language;
converting the search request into a list of search words, the list of search words including most restrictive search words having essential words from the search request, the list further including additional search words derived from the essential words from the search request;
converting the search words into a string of bytes;
searching a datasoup with the string of bytes, the datasoup being a subset of the target database and having data;
matching the string of bytes with the data in the datasoup; and
retrieving results from the target database;
creating an individual preference file for each user;
storing information about the user in the individual preference file, said information selected from the group consisting of: the user's identification, the user's queries, the user's own vocabulary, use of synonyms, common spelling errors, and unique writing style, said information being automatically created for each new user and updated at each access of said user as new information is automatically obtained from said user; and retrieving information from the preference file to analyze the user's search request without regard to stored information from preference files of other users.

22. The program storage device as recited in claim 21, the method further comprising the step of accessing a system database, the system database storing global rules, the preference file for each user, and one or more dictionaries.

23. The program storage device as recited in claim 21, the method further comprising the steps of:

identifying essential words in the search request;

extracting essential words from the search request in order to generate most restrictive search words; and generating the additional search words from the essential words using synonyms, phonetically similar words, and spelling corrections.

24. The program storage device as recited in claim 23, further comprising the steps of:

searching the target database using the most restrictive search words; and searching the target database using the additional search words in a predetermined order.

* * * * *

UNITED STATES PATENT AND TRADEMARK OFFICE
CERTIFICATE OF CORRECTION

| | | |
|---|---|---|
| PATENT NO. | : 6,598,039 B1 | Page 1 of 1 |
| APPLICATION NO. | : 09/327605 | |
| DATED | : July 22, 2003 | |
| INVENTOR(S) | : Livowsky | |

It is certified that error appears in the above-identified patent and that said Letters Patent is hereby corrected as shown below:

Claim 14, col. 14, lines 4 - 13, delete the entire claim and replace it with --The system according to claim 12, wherein the ME converts the search request into a list of search words by various approximations--;

Claim 19, col. 14, line 37 change "claim 11" to --claim 10--.

Signed and Sealed this

Fifth Day of June, 2007

JON W. DUDAS
*Director of the United States Patent and Trademark Office*